US012785614B2

(12) United States Patent
Roch et al.

(10) Patent No.: US 12,785,614 B2
(45) Date of Patent: Nov. 3, 2026

(54) DEVICE AND METHOD FOR SUNLIGHT TRACKING FOR SOLAR-BASED POWER GENERATION DEVICES

(71) Applicant: Voltiris SA, Lausanne (CH)

(72) Inventors: Jonas Roch, Lausanne (CH); Dominik Blaser, Bern (CH)

(73) Assignee: Voltiris SA, Lausanne (CH)

( * ) Notice: Subject to any disclaimer, the term of this patent is extended or adjusted under 35 U.S.C. 154(b) by 99 days.

(21) Appl. No.: 18/840,117

(22) PCT Filed: Feb. 25, 2023

(86) PCT No.: PCT/EP2023/054761
§ 371 (c)(1),
(2) Date: Aug. 21, 2024

(87) PCT Pub. No.: WO2023/161456
PCT Pub. Date: Aug. 31, 2023

(65) Prior Publication Data

US 2025/0158562 A1 May 15, 2025

(30) Foreign Application Priority Data

Feb. 25, 2022 (EP) .................................... 22158825

(51) Int. Cl.
*H02S 20/32* (2014.01)
*G05D 3/10* (2006.01)

(52) U.S. Cl.
CPC ............. *H02S 20/32* (2014.12); *G05D 3/105* (2013.01)

(58) Field of Classification Search
CPC .......... H02S 20/30; H02S 20/32; G05D 3/105
See application file for complete search history.

(56) References Cited

U.S. PATENT DOCUMENTS

| | | | | |
|---|---|---|---|---|
| 7,230,819 B2 * | 6/2007 | Muchow | ................ | F24S 25/70 361/825 |
| 10,190,802 B1 | 1/2019 | Almotlaq et al. | | |

(Continued)

FOREIGN PATENT DOCUMENTS

| | | |
|---|---|---|
| DE | 10022236 A1 | 11/2001 |
| EP | 2657624 A1 | 10/2013 |
| ES | 2268936 A1 | 3/2007 |

*Primary Examiner* — Kevin K Pyo
(74) *Attorney, Agent, or Firm* — Dinsmore & Shohl LLP

(57) ABSTRACT

The present invention relates to an energy generation device driving system adapted to bear an energy generation device (1) on a holding structure (2) comprising at least one actuator (31, 32) adapted to generate two linear motions and at least one transmission module (41, 42) adapted to transmit said two linear motions, a movement transformation module (5) for transforming said transmitted two linear motions into the two rotational movements and transmitting said two rotation movements to the energy generation device (1), comprising a first rotation mechanism (51) adapted to receive a first one of said two linear motions and transform it in a first rotation movement and transmit it to said energy generation device (1), and a second rotation mechanism (52) adapted to receive a second one of said two linear motions and transform it in a second rotation movement and transmit it to said energy generation device (1), wherein at least one of the first and second rotation movement is an energy generation device azimuthal rotation movement and each of the first and second rotation mechanisms (51, 52) comprises a specific linear to rotation movement transformation module (511, 521), characterized in that the linear to rotation movement transformation modules (511, 521) are disposed on each side of the holding structure (2) so as to be off-centered with respect to the azimuthal rotation axis of said energy generation device (1).

20 Claims, 4 Drawing Sheets

(56) References Cited

U.S. PATENT DOCUMENTS

| | | | |
|---|---|---|---|
| 2008/0040990 | A1 | 2/2008 | Vendig |
| 2012/0125404 | A1* | 5/2012 | Dos Santos Teixeira Ramos ....... F24S 23/77 136/246 |

* cited by examiner

DEVICE AND METHOD FOR SUNLIGHT TRACKING FOR SOLAR-BASED POWER GENERATION DEVICES

CROSS REFERENCE TO RELATED APPLICATIONS

This application is a U.S. National Stage under 35 U.S.C. § 371 of PCT/EP2023/054761 filed Feb. 25, 2023, which depends from and claims priority to European patent application number 22158825.4 filed Feb. 25, 2022, the entire contents of which are incorporated herein by reference.

TECHNICAL FIELD

The present invention relates to the field of sunlight-based power generation and more particularly to the field of sunlight-based power generation in agriculture. The present invention also aims at providing a means for improving power generation and not impacting agriculture growth.

In general, the present invention relates to the field of sunlight-based power generation and the mechanisms that enable Sun tracking for improving the power generation output. Specifically, the present invention is foreseen for use in agriculture.

BACKGROUND OF THE ART

Nowadays, Photovoltaic (PV) power generation is seen as a green and low-cost source of energy world-wide as well as a key element paving the way to a fossil energy-free future. However, finding space for large PV projects remains challenging because by creating a PV field, one may either waste arable land or hurt biodiversity by increasing the human footprint. For this reason, modern projects commonly called “Agrovoltaics” have been created which aim at promoting a double use of available land, in which a field of arable land could simultaneously be used for power generation as well as agricultural yield.

It has been shown that tracking the sun along its trajectory in order to optimize the performance of a solar energy generator increases the power generation per day by around 30-40%. However, a dual-axis solar tracking mechanism adds complexity and cost compared to a fixed solar energy generator. In practice, large photovoltaic plants will sometimes implement a uniaxial tracking system, following the course of the sun in the elevation angle (North-South axis), as the cost of uniaxial systems is compensated by a gain in energy production. Systems as for instance CN112436793A or US2018091088A1 are systems adapted for array tracking however only optimized to track the sun along one axis.

A double-axis solar tracking system is however necessary for applications such as solar hydrogen generation, concentration solar plants (CSPs), high-concentration photovoltaics (HCPV) or in some cases low-concentration photovoltaics (LCPV), in JPH11258042A or WO2010065794A2, for example. In the existing systems, the dual-solar tracking is solved by independently performing the solar tracking on each solar energy generating device, such as in CN210431323U, WO2013115832A2.

Solutions to the problem of the dual-axis solar tracking for a large array of solar energy generating devices have been investigated but still present problems.

Solutions such as JPH11258042A, enabling dual-axis solar tracking, need a separated motor/actuator for each panel to power the elevation movement placed over the azimuthal motion.

US2011240007A1 presents another conventional system which uses a mechanism with bevel gears to transform a horizontal linear motion into a vertical rotation motion. The solution contains a single vertical axis holding the panel and driving the movement in both azimuth and elevation. Therefore, this axis needs to be mechanically strong to withstand torque on the panel, making it a heavy-duty mechanical part, enhancing cost and material use and creating a large shadow behind the module, that can be detrimental in applications like agrovoltaics.

CN210431323U uses stepper motors to power the dual-axis tracking system, implying either a constant power consumption to keep the holding torque or an additional locking mechanism. By having two stepper motors per module, the electrical cabling of the motors becomes complicated and expensive.

There is therefore a need for such a system which solves the problems of Prior Art recited above.

In this regard, a primary object of the invention is to solve the above-mentioned problems and more particularly to provide a system permitting to easily track the sunlight and orient the surface of the reflecting panels so as to receive the maximum light from the light source, i.e. the sun or the moon, without having to deal with torsion within a shaft.

Another object of the invention is to provide a system permitting to optimize the energy or power generation at any time of the day and in any season.

Another object of the invention is to provide a system permitting to optimize the light amount arriving at the plants in the land by minimizing the shading induced by the Sun tracking mechanism.

SUMMARY OF THE INVENTION

The above problems are solved by the present invention which presents a mechanical setup enabling a dual-axis (azimuth and elevation) tracking of the sun for an array of solar energy generating devices.

The presented mechanism allows to share two motors/actuators/hydraulic cylinders for the dual-axis tracking for a whole line or array of reflectors, hence reducing costs and complexity. Unlike most Prior Art, the motion in the two axis is actioned by linear motions, solving the problem of torsion for circular motion transmission over a line of reflectors. Furthermore, using linear motions to power the module tracking solves the problem when distributing the actuator power onto several separate lines of solar energy generators, as illustrated in the following. No transmission system (with power losses) is needed to deviate a rotational movement around a 90-degree angle; simple holding structures are sufficient. The use of linear movements along one reflector line also simplifies the transmission to several lines of reflectors in parallel.

Preferably, additionally. the linear motion can be implemented into the support structure using a nut/notch/slot/groove, including the transmission components, which has the advantage of limiting additional shade onto crops. Furthermore, the nut-shaped guiding profile prevents any problems of buckling. Hence the torsion problem of a rotatory system is not transformed into a flexion/buckling problem.

The use of a gear multiplication on each solar energy generating module enables the use of lower power actuators to power the linear motion and hence allowing for a solar tracking using motors/actuators with little power. Furthermore, the presented solution using linear actuators (with internal screw transmission) is a self-blocking system therefore, no additional blocking device with possibly another control mechanism is needed.

A first aspect of the invention is an energy generation device driving system adapted to bear an energy generation device on a holding structure comprising an at least one actuator adapted to generate two linear motions and at least one transmission module adapted to transmit said two linear motions, a movement transformation module for transforming said transmitted two linear motions into the two rotational movements and transmitting said two rotation movements to the energy generation device, comprising a first rotation mechanism adapted to receive a first one of said two linear motions and transform it in a first rotation movement and transmit it to said energy generation device, and a second rotation mechanism adapted to receive a second one of said two linear motions and transform it in a second rotation movement and transmit it to said energy generation device, wherein at least one of the first and second rotation movement is an energy generation device azimuthal rotation movement and each of the first and second rotation mechanisms comprises a specific linear to rotation movement transformation module, characterized in that the linear to rotation movement transformation modules are disposed on each side of the holding structure so as to be off-centered with respect to the azimuthal rotation axis of said energy generation device. Thanks to this arrangement, the azimuthal torque can be improved with a simple mechanism and one can use the bevel gear, or any other simple mechanism (e.g. a cable) enabling a rotational movement along an inclination, on the azimuthal axis.

Advantageously, the actuator is a motor and/or the transmission module comprises rods or cables.

In a preferred way, the transmission module is placed on the holding structure supporting several energy generation devices such that the actuator generates the linear movements along or inside said holding structure such that they are transmitted by the transmission module and distributed between the several solar energy generation modules through several movement transformation modules.

According to a preferred embodiment of the present invention, the several energy generation devices are rotated simultaneously.

Preferably, the energy generation device driving system further comprises a first and a second actuators and a first and a second transmission modules each generating and transmitting a linear movement to said first rotation mechanism and said second rotation mechanism, respectively.

Advantageously, the first rotation mechanism is an azimuthal rotation mechanism comprising a first local gearing system.

In a preferred way, the first local gearing system comprises a first gear adapted to be rotated by a first linear rack or roll mounted on the holding structure and adapted to be linearly moved by said first transmission module and which in turn rotates and transmit this rotational movement to the energy generation device.

Preferably, the first gear transmits the rotational movement to the energy generation device via a bearing thanks to a second gear rotating with the first gear and engaged an internal gearing provided on the internal surface of the bearing.

Advantageously, the first and second gears are spur gears.

Alternatively, the first gear transmits the rotational movement to the energy generation device thanks to a second gear rotating with the first gear and engaged with a gearing provided on the rotational axis of the energy generation device.

Preferably, the first local gearing system further comprises a base holding plate adapted to be fixed to the holding structure and onto which are mounted at least one of the first and second gear, the internal gearing, the gearing and the bearing.

According to a preferred embodiment of the present invention, the second rotation mechanism is an elevation movement mechanism comprising a second local gearing system.

Advantageously, the second local gearing system comprises a third gear adapted to be rotated by a second linear rack or roll mounted on the holding structure and adapted to be linearly moved by said second transmission module and which in turn drives a component chosen in the group comprising a bevel gear and a device such as a cable or a chain, adapted to enable a movement around an inclination/angle, and which actions a second component chosen in the group comprising a second bevel gear or a device such as a cable or a chain, adapted to enable a movement around an inclination/angle, mounted at 90° and driving a seventh gear which in turns drives the energy generation device.

Preferably, the third gear rotates with a fourth gear which is engaged with a fifth gear provided on the rotational axis of the energy generation device and rotating with a first bevel gear actioning a second bevel gear which transmits the rotational movement to the sixth gear engaged with the seventh gear.

According to a preferred embodiment of the present invention, the bevel gear are helical bevel gears.

Preferably, the third to sixth gears are spur gears

Advantageously, the energy generation device driving system further comprises a compensation system adapted to correct the elevation during the azimuthal rotation.

In addition, the compensation system can be either activated during the setup or can be a passive system, such as a spring, to compensate for wear and clearance in the gearing stages or cable systems.

Preferably, the transmission module is adapted to drive each rotation mechanism independently from each other.

A second aspect of the invention is an orientation-optimization system orienting an energy generation device accordingly and comprising the energy generation device driving system of the first aspect and a driving system control module adapted to control the driving system to orient the energy generation device in order to optimize the electrical and/or the agronomic yield, i.e. to optimize the quality of crop-reaching light for example by orienting the energy generation device so as to let the light pass at maximum when the daylight is not optimal.

A third aspect of the invention is a light-source tracking system for tracking a light source and orienting an energy generation device accordingly comprising the energy generation device driving system of the first aspect, a light-source positioning module and a driving system control module adapted to control the driving system to orient the energy generation device according to the detected light source position.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
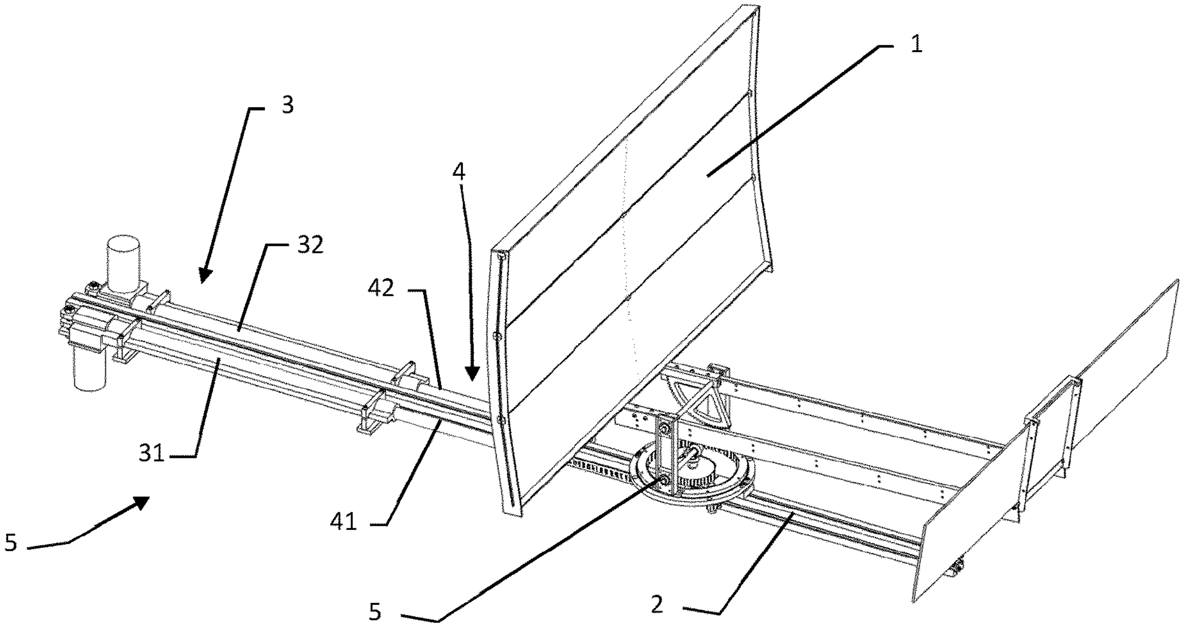
FIG. 1 represents the general concept of the present invention.

FIG. 1 depicts the general concept of the invention where a solar energy generating device 1 is supported by a holding structure 2 which is equipped with a sun-tracking/orienting device 6.

As mentioned above, an object of the invention is to move one or more solar energy generating device 1 towards the sun at all times of the day (or night with the moonlight) to increases its efficiency by 30-40%. However, since in order to improve the energy generation, several such devices are used simultaneously, the object of the invention is also to provide a system permitting moving an array of solar energy generating devices 1 towards the sun in a simple way.

The basic principle of the present invention it to develop a sun-tracking/orienting device 6 that enables to reduce the number of used actuators or motors 3 for driving several solar energy generating devices 1.

The solution to this technical problem is the sun-tracking/orienting device 6 of the present invention which comprises a sun-tracking/orienting mechanism including one or more actuator, preferably a motor, 3 adapted to generate two linear motions/movements, a transmission module 4 adapted to transmit the two linear motions/movements and a local gearing system 5 which transforms the two linear motions/movements into the two rotational motions/movements necessary to follow the sun, where the two rotational motions/movements are preferably azimuthal and elevation motions/movements and the two linear motions/movements are preferably along the holding structure 2, also called beam.

The actuator 3 can be a single element or several of the same, synchronized or not, placed on opposite faces of the holding structure, and the transmission module 4 may have the form of a longitudinal guiding element such as rods or cables. They are preferably placed on one or several holding structures 2, along which the linear movements are generated by the actuator 3 and transmitted by the transmission module 4 and distributed, preferably evenly, between the several solar energy generating devices 1 through each local gearing system 5. Indeed, according to this embodiment, each solar energy generating device 1 is mounted on the holding structure through the local gearing system 5.

Figure 5A:
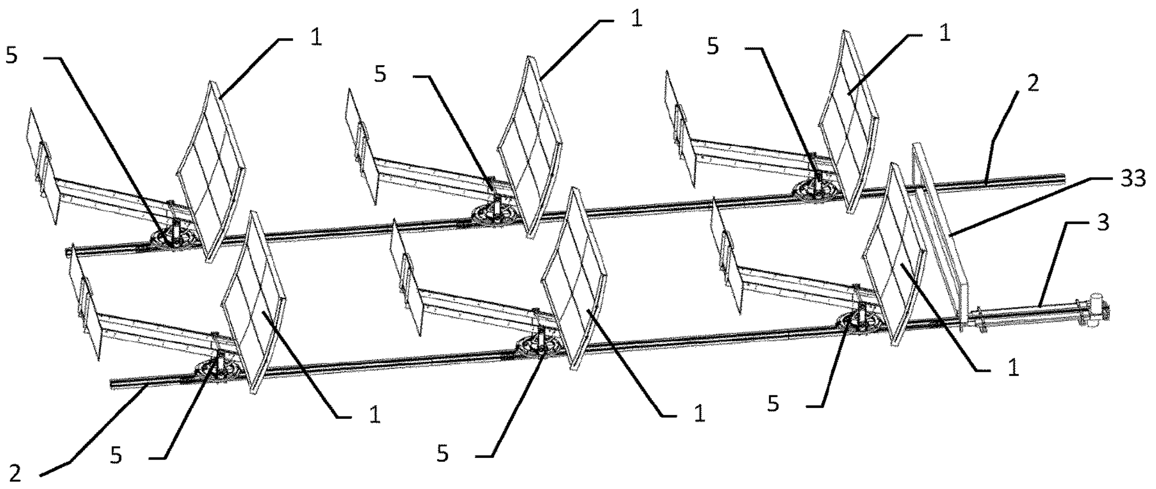
FIGS. 5A and 5B represent an embodiment of the present invention with an arrangement using two holding structures each having several solar energy modules, where mechanisms are used to perform the orientation of several reflectors at once.
Figure 5B:
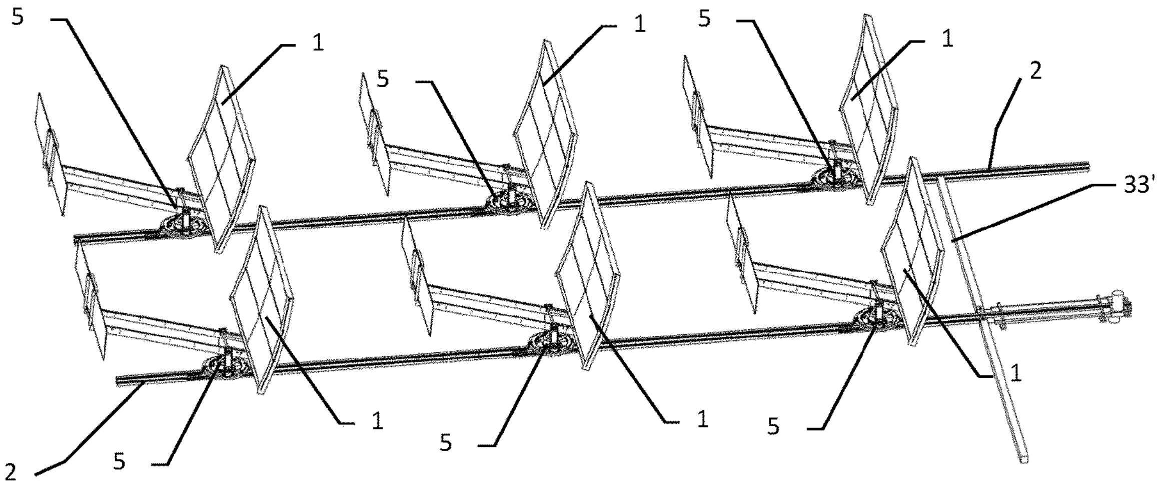

The linear movement transmission simplifies the sharing of transmission over several solar energy generating device 1: according to a preferred embodiment at least two linear actuators 31, 32 are provided preferably at an end of a holding structure 2 supporting a plurality of solar energy generating device 1 (in FIGS. 5A and 5B three are represented but this number vary of course). While this is enough to move several solar energy generating devices 1 simultaneously the invention is not limited to this number.

In order to transform the two linear motions into two rotational motions necessary for tracking/following the sun, two mechanisms 51, 52 are present for each local gearing system 5, the azimuthal movement (preferably rotation) mechanism 51 and the elevation movement (preferably rotation) mechanism 52. Each mechanism comprises a particular and preferably independent gearing mechanism at each local gearing system 5 which solves the issue of having a mechanically strong (heavy duty) movement transmission system. This reduces material costs as only locally the gearing stages need to resist to higher torques.

In order to reduce torque on the structure holding the solar energy generating device, it is better to place the elevation movement mechanism over the azimuthal movement mechanism as the solar energy generator will never tilt with respect to the horizontal plane.

Figure 2A:
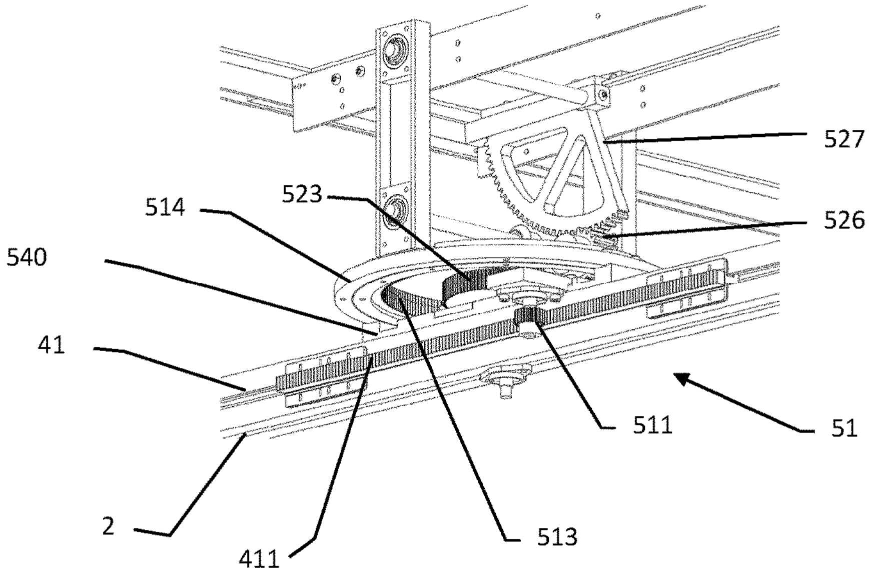
FIGS. 2A and 2B represent the first (azimuthal) and second (elevation) movement mechanisms according to a preferred embodiment of the present invention.
Figure 3:
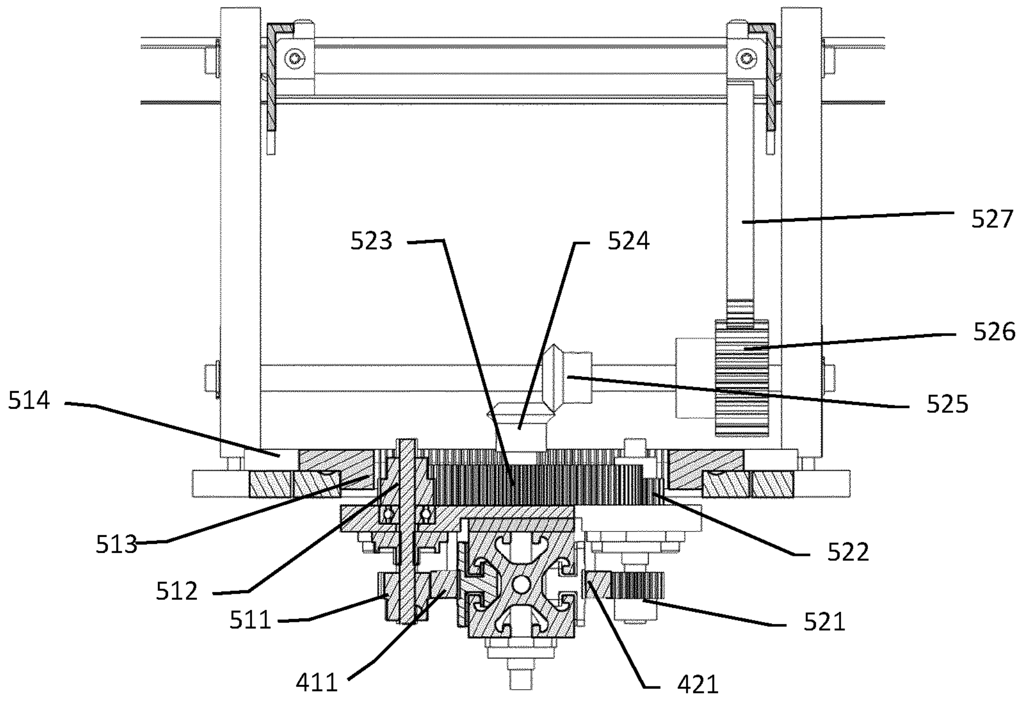
FIG. 3 represents a cross-section view of the sun-tracking/orienting mechanism according to the preferred embodiment of the present invention.

The azimuthal movement mechanism 51 is depicted in FIGS. 2A and 3. It comprises a first gear 511 which is adapted to be rotated by the linear movement of a first linear rack 411 of a first transmission module 41 mounted on the holding structure which is linearly moved by the first actuator 31. This already transforms the linear movement of the first transmission module 41 into a first rotational movement of the gear 511. The linear to rotational movement transmission can also be achieved by cables to reduce material use further. Next, the rotational movement of the first gear 511 is transmitted via a second gear 512, rotating together with the first gear 511, to an internal gearing 513 connected to a bearing 514, preferably in a fixed manner, which in turns drives the solar energy generating device 1. In this manner, the linear movement across the transmission stage manages to impose the azimuthal orientation of the devices 1.

Figure 2B:
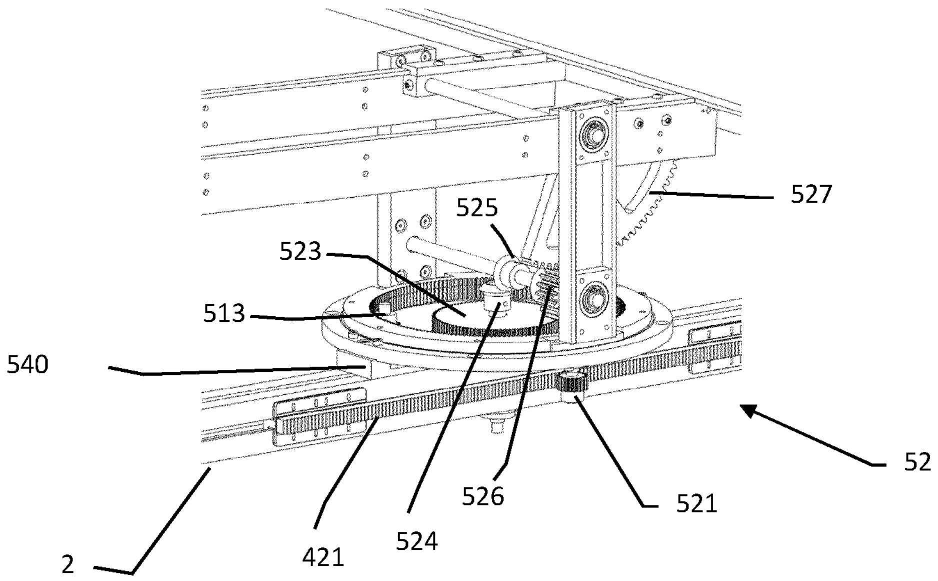

On top of this movement, the elevation movement mechanism 52 is depicted in FIGS. 2B and 3. It comprises a third gear 521 which is adapted to be rotated by the linear movement of a second linear rack 421 of a second transmission module 42 mounted on the holding structure and ideally placed on the opposite side with respect to the first rack 421 and which is linearly moved by the second actuator 32. This already transforms the second linear movement of the second transmission module 42 into a second rotational movement of the gear 521.

Next the third gear 521 transmits its rotational movement to a fifth gear 523 via a fourth gear 522, rotating together with the third gear 521. The fifth gear 523 is connected to a first bevel gear 524 so as to rotate together with it (The bevel gear can be a helical bevel gear to increase the strength of the gearing). The first bevel gear 524 actions on a second bevel gear 525 mounted at 90°. This latter rotation axis is connected to a sixth gear 526 that will drive the motion (elevation) of a seventh gear 527 mounted directly on the solar energy generating device 1. To reduce backlash, the gear transmission system might contain springs.

It has to be noted that the first to sixth gears are preferably spur gears and the spur gears can be pin gears although they can be helicoidal gears if the same function is achieved. Also, the linear racks are preferably chosen from the group comprising gear racks and pin racks.

It can be that the azimuthal motion is coupled to the elevation motion such that a change in azimuth results in a small change in elevation. This motion can be compensated with the motion of the linear actuator driving the elevation mechanism. On the other hand, a change in elevation stage does not affect the azimuthal orientation.

The tracking system comprises therefore gearing mechanisms that enable two-axis tracking in a simple manner. The possibility to move the actuators 31, 32 independently solves the issues and the connected risk that if one actuator is broken, the system does not block, which could lead to further failure.

Figure 4A:
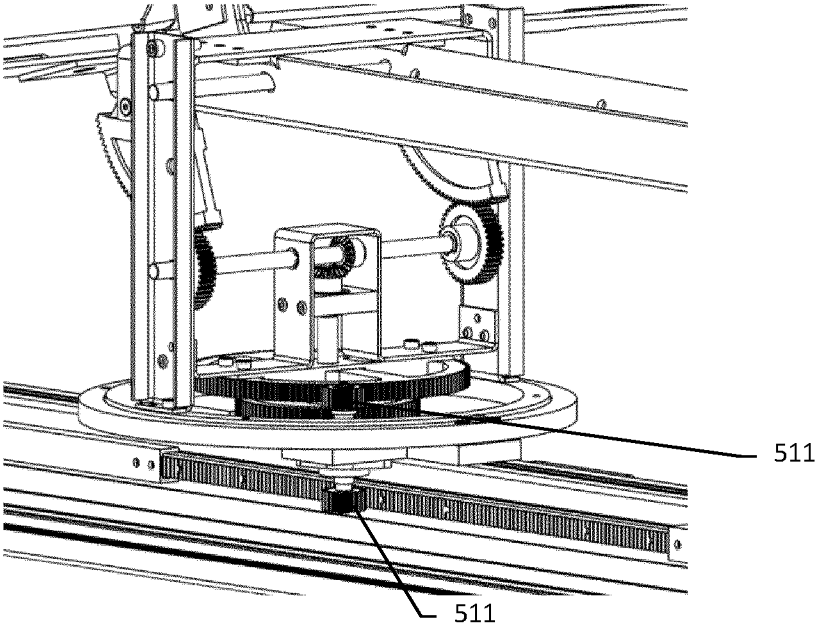
FIGS. 4A and 4B represents a perspective and a cross-section view of the mechanism according to a second embodiment of the present invention.
Figure 4B:
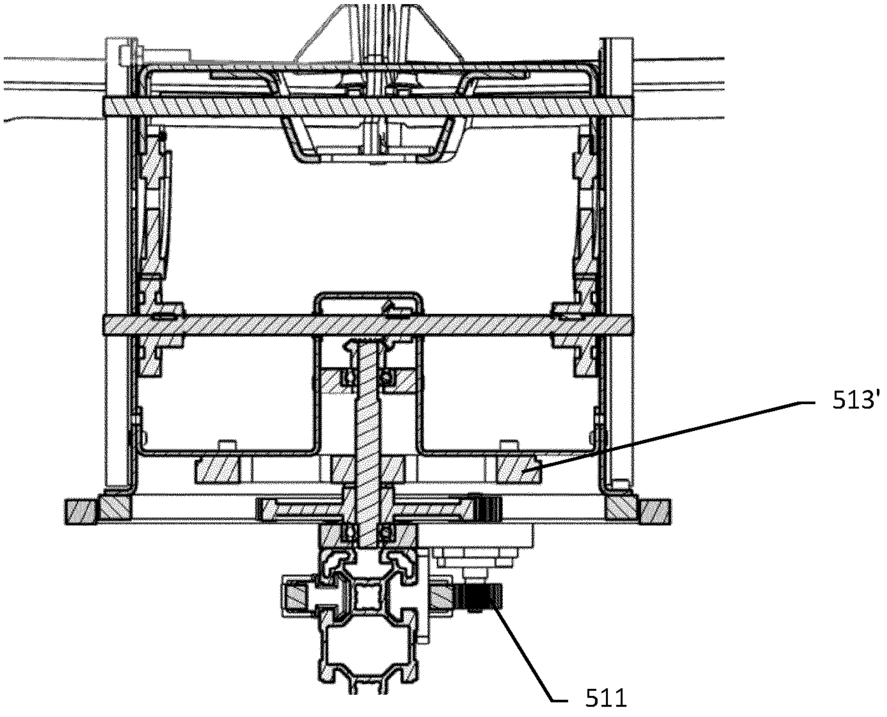

FIGS. 4A and 4B show an alternative embodiment of the invention and more particularly an alternative embodiment the azimuthal movement mechanism 51 depicted in FIGS. 2A and 3.

In this alternative embodiment, it still comprises a first gear 511 which is adapted to be rotated by the linear movement of a first linear rack 411 of a first transmission module 41 mounted on the holding structure which is linearly moved by the first actuator 31. Also, here as well, this already transforms the linear movement of the first transmission module 41 into a first rotational movement of the first gear 511 and the linear to rotational movement transmission can also be achieved by cables to reduce material use further.

In this embodiment however, the rotational movement of the gear 511 is transmitted via another gear 512 to a gearing 513' which is not internal to the bearing 514 but which is fixedly attached to the rotational axis of the device so as to directly drive the solar energy generating device 1.

As we can see as least one of the first and second rotation mechanisms also preferably comprise a base holding plate 540 adapted to be fixed to the holding structure and onto which are mounted at least one of the first to fifth gears, the internal gearing, the gearing and the bearing.

When several holding structures 2, each supporting at least one solar energy module 1, are installed, several possibilities may be observed. A first option is to equip each holding structure 2 with a dedicated actuator 3 and transmission module 4. Alternatively, as shown in FIGS. 5A and 5B, a single actuator 3 is present and its motion can be transferred to the other holding structures 2 through a U-shaped holding structure and one straight holding structure transverse to the linear movement direction (FIG. 5A) to replicate the linear movements on the line containing the actuators. Another mechanism (FIG. 5B) relies on the symmetry of the transmission mechanism and uses two straight holding structures transverse to the linear movement direction to transfer the linear motion. In this case, every two lines of power generators, the dedicated transmission modules 200 at each solar energy module will be inverted.

The invention also relates to a light-source tracking system for tracking a light source, preferably the sun, and for orienting one or several energy generation devices 1 according to the light source position to optimize and/or maximize the sunlight reception on the panels. This light source tracking system comprises the energy generation device driving system described above as well as a light-source positioning module which can be of any suitable type such as a camera or a light senor or the like, and a driving system control module adapted to control the energy generation device driving system to orient the energy generation device according to the detected light source position.

The control module may also comprise a processing unit which calculates the optimal orientation of the panels according to several parameters such as season, weather, environment, and the like.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different gears, materials, angles which can be used. Furthermore, it should be intended that the system and the device of the present invention is adapted to be used outdoor, i.e. in an open-field, or indoor, for example, in a greenhouse, and that the power generating device, although it preferably relates to a solar panel may generate energy with a different light source and can be any shape of panel.

The invention claimed is:

1. An energy generation device driving system adapted to bear an energy generation device (1) on a holding structure (2) comprising:

at least one actuator (31, 32) adapted to generate two linear motions and at least one transmission module (41, 42) adapted to transmit said two linear motions, a movement transformation module (5) for transforming said transmitted two linear motions into two rotational movements and transmitting said two rotation movements to the energy generation device (1), comprising a first rotation mechanism (51) adapted to receive a first one of said two linear motions and transform it in a first rotation movement and transmit it to said energy generation device (1), and a second rotation mechanism (52) adapted to receive a second one of said two linear motions and transform it in a second rotation movement and transmit it to said energy generation device (1), wherein at least one of the first and second rotation movement is an energy generation device azimuthal rotation movement and each of the first and second rotation mechanisms (51, 52) comprises a specific linear to rotation movement transformation module (511, 521), characterized in that the linear to rotation movement transformation modules (511, 521) are disposed on each side of the holding structure (2) so as to be off-centered with respect to an azimuthal rotation axis of said energy generation device (1).

2. The energy generation device driving system according to claim 1, characterized in that the actuator (31, 32) is a motor and/or the transmission module (41, 42) comprises rods or cables.

3. The energy generation device driving system to claim 1, characterized in that the transmission module (41, 42) is placed on a holding structure (2) supporting several of said energy generation device (1) such that the actuator (31, 32) generates the linear movements along or inside said holding structure (2) such that they are transmitted by the transmission module (41, 42) and distributed between the several solar energy generation modules (1) through several movement transformation modules (5).

4. The energy generation device driving system according to claim 3, characterized in that the several energy generation devices (1) are rotated simultaneously.

5. The energy generation device driving system according to claim 1, characterized in that it comprises a first and a second actuators (31, 32) and a first and a second transmission modules (41, 42) each generating and transmitting a linear movement to said first rotation mechanism (51) and said second rotation mechanism (52), respectively.

6. The energy generation device driving system according to claim 1, characterized in that the first rotation mechanism (51) is an azimuthal rotation mechanism comprising a first local gearing system.

7. The energy generation device driving system according to claim 6, characterized in that the first local gearing system (51) comprises a first gear (511) adapted to be rotated by a first linear rack or roll (411) mounted on the holding structure (2) and adapted to be linearly moved by said first transmission module (41) and which in turn rotates and transmit this rotational movement to the energy generation device (1).

8. The energy generation device driving system according to claim 7, characterized in that the first gear (511) transmits the rotational movement to the energy generation device (1) via a bearing (514) thanks to a second gear (512) rotating with the first gear (511) and engaged an internal gearing (513) provided on the internal surface of the bearing (514).

9. The energy generation device driving system according to claim 7, characterized in that the first gear (511) and a second gear (512) are spur gears.

10. The energy generation device driving system according to claim 7, characterized in that the first gear (511) transmits the rotational movement to the energy generation device (1) thanks to a second gear (512) rotating with the first gear (511) and engaged with a gearing (513') provided on the rotational axis of the energy generation device (1).

11. The energy generation device driving system according to claim 7, characterized in that the first local gearing system (51) further comprises a base holding plate (540) adapted to be fixed to the holding structure (2) and onto which are mounted at least one of the first gear (511) and a second gear (512), the internal gearing (513), the gearing (513') and the bearing (514).

12. The energy generation device driving system according to claim 1, characterized in that the second rotation mechanism (52) is an elevation movement mechanism comprising a second local gearing system.

13. The energy generation device driving system according to claim 12, characterized in that the second local gearing system (52) comprises a third gear (521) adapted to be rotated by a second linear rack or roll (421) mounted on the holding structure (2) and adapted to be linearly moved by said second transmission module (42) and which in turn drives a component (524) chosen in the group comprising a bevel gear and a device, adapted to enable a movement around an inclination/angle, and which actions a second component (525) chosen in the group comprising a second bevel gear or a device, adapted to enable a movement around an inclination/angle, mounted at 90° and driving a seventh gear (527) which in turns drives the energy generation device (1).

14. The energy generation device driving system according to claim 13, characterized in that the third gear (521) rotates with a fourth gear (522) which is engaged with a fifth gear (523) provided on the rotational axis of the energy generation device (1) and rotating with a first bevel gear (524) actioning a second bevel gear (525) which transmits the rotational movement to the sixth gear (526) engaged with the seventh gear (527).

15. The energy generation device driving system according to claim 13, characterized in that the bevel gears (524, 525) are helical bevel gears.

16. The energy generation device driving system according to claim 14, characterized in that the third to sixth gears (521-526) are spur gears.

17. The energy generation device driving system according to claim 1, characterized in that it further comprises a compensation system adapted to correct an elevation during the azimuthal rotation.

18. The energy generation device driving system according to claim 1, characterized in that the transmission module (41, 42) is adapted to drive each rotation mechanism independently from each other.

19. An orientation-optimization system for orienting the energy generation device accordingly and comprising the energy generation device driving system of claim 1 and a driving system control module adapted to control a driving system to orient the energy generation device in order to optimize electrical and/or agronomic yield.

20. A light-source tracking system for tracking a light source and orienting the energy generation device accordingly comprising the energy generation device driving system of claim 1, a light-source positioning module and a driving system control module adapted to control a driving system to orient the energy generation device according to the detected light source position.

* * * * *